Patented Sept. 1, 1931

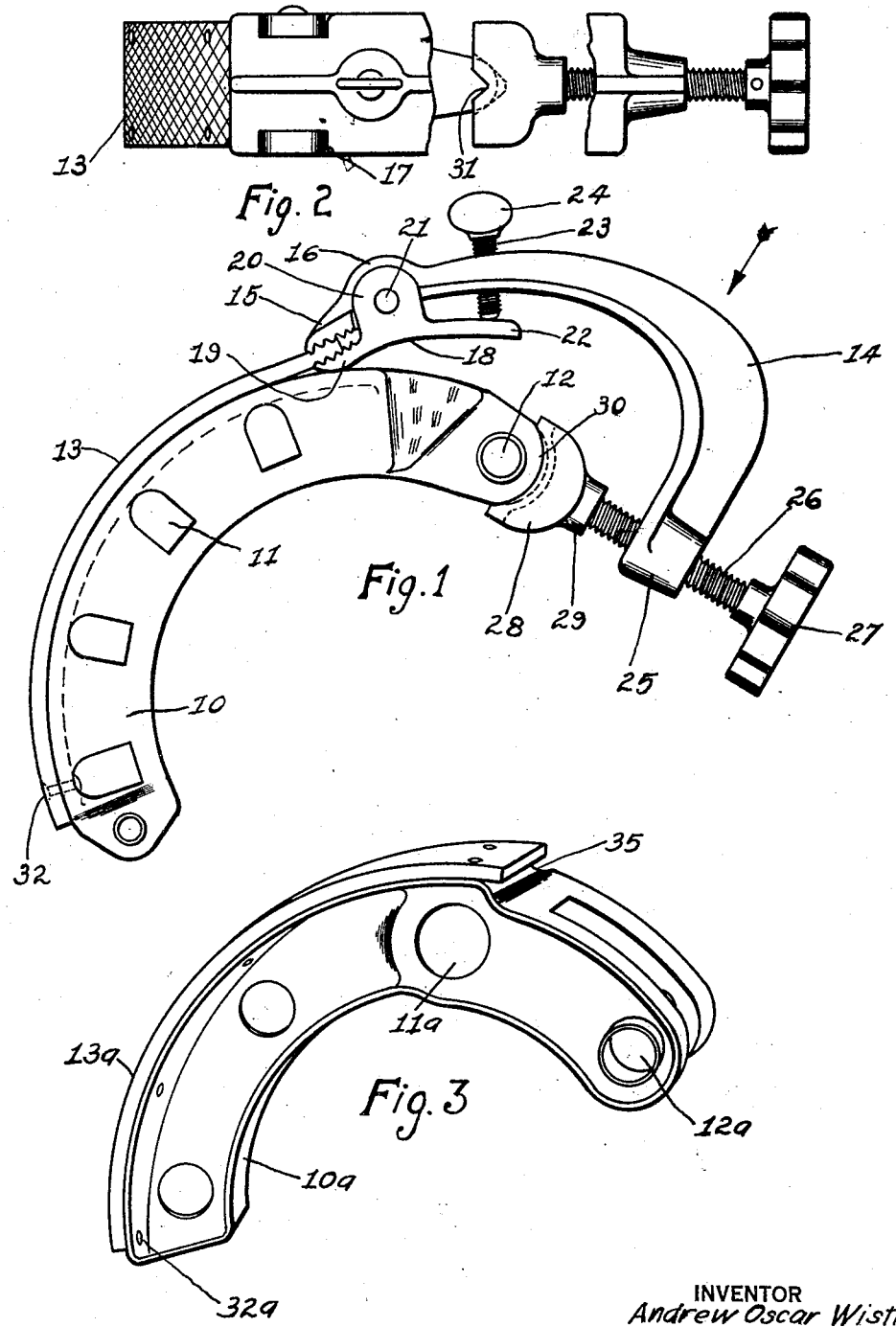

1,821,283

UNITED STATES PATENT OFFICE

ANDREW OSCAR WISTI, OF MINNEAPOLIS, MINNESOTA

BRAKE LINING STRETCHER

Application filed August 31, 1929. Serial No. 389,768.

My invention relates to brake lining stretchers and has for its object the production of a tool for stretching brake lining for riveting or otherwise securing the brake lining upon the brake shoe or shoes while under substantial tension so that when the brake lining is in braking service it will not tend to stretch or become wavy or uneven and thereby lessening its braking efficiency.

My invention overcomes all of these difficulties and provides a simple, durable and highly efficient tool which readily subjects the brake lining to a stretching tension above that which could possibly be applied thereto by the fingers of both hands, and yet my tool leaves one or even both hands of the operator free to apply the rivets without being burdened and encumbered by the manual stretching, or attempt to stretch, the brake lining, and thus my improved tool readily enables even a comparatively inexperienced operator to do even more and better work than one skilled in the art of manual stretching and applying brake lining.

A further object of my invention is to provide a tool that is universally applicable to all of the standard types of brake shoes so that one tool may be efficiently employed at will in lining each of the different standard forms of brake shoes.

Figure 1 is a side elevation view of my tool applied to one type of brake shoe.

Figure 2 is a top plan view of my tool as viewed from the direction of the arrow in Figure 1, and Figure 3 is a side perspective view of the other type of brake shoe to which my invention may also be readily applied for stretching the brake lining while the same is being secured thereon.

In said drawings illustrating the preferred form of my invention, 10 represents the brake shoe having pivot bearing openings 11 and 12, located at and toward one end of said shoe. The brake lining 13 is preferably cut to suitable lengths required for the shoes to be lined and one end of said lining is preferably riveted to one end of said shoe 10, preferably the end opposite that provided with said hole 12. The arm 14 is provided at one end with a preferably integral jaw 15 having a thickened portion 16 adjacent the commencement of said jaw 15 and preferably provided with a recess 17 at each of the opposite ends of said thickened portion 16.

A rocker plate 18 having jaw 19 at one end thereof coincident with said jaw 15 and preferably integral lugs 20 on opposite sides thereof occupying said recesses 17 and with said thickened portion 16 extending between said lugs 20. Rivet 21 passing through said lugs 20 and thickened portion 16 pivotally connects said rocker plate 18 to said arm 14. The rocker plate 18 has an extension 22 extending from lugs 20 in the direction substantially opposite to jaw 19, and said end 22 is adapted to be engaged by the end of a screw 23 having a flattened or squared operating end 24 and threaded through the said arm 14 and adapted to contact with the end 22 of the rocker plate 18.

The juxtaposed surfaces of said jaws 15 and 19 are provided with roughened or laterally extending corrugated surfaces in order to securely hold the brake lining when clamped between said jaws by the action of screw 23.

The jaws 15 and 19 are at preferably one end of said arm 14 whose opposite end is curved preferably toward that side of said arm 14 provided with said rocker plate 18, and said curved end extends appreciably and is provided preferably at its extremity with a round boss 25, having a screw 26 threaded therethrough provided with hand wheel 27 rigid upon its outward projecting end and a channeled clamping head 28 having preferably at its center the boss 29 volubly and preferably non-removably mounted upon the inner or opposite end of said screw 26. Upon its surface opposite the boss 29 said clamping head 28 is provided with a channel 30 preferably extending throughout the length of said clamping head 28 and in substantially the center of said channel 30 is a preferably semi-round deeper channel 31.

When the brake lining 13 is secured at one end by jaws 15 and 19, the remaining end of said brake lining 13 is secured by rivets 32 to the opposite end of brake shoe 10. There-after the screw 26 is turned by wheel 27 to cause the opposite ends of channel 30 in clamping head 28 to engage the bifurcated end of brake shoe 10 having said bearing opening 12 through the center of said end. Said screw 26 is so operated until a requisite stretching of brake lining 13 is attained, whereupon rivets are inserted by hand or by any suitable tool securing brake lining 13 to shoe 10 by said rivets being passed through said brake lining and holes appropriately spaced in said brake shoe 10. Said rivets may be either of the split type variety, which may be pushed through the brake lining at its pointed and pronged end, or by tubular or other rivets which may be passed through holes formed in the brake lining 13 after being stretched by tool and said holes formed in said lining in registration with the rivet holes existing in the shoe 10.

In the type of shoe shown in Figure 3 the channel 31 in clamping head 28 is adapted to engage the end of the shoe 10a which is most bare of lining.

It will thus be obvious that I have provided a simple, neat, durable and universally applicable means for stretching brake lining upon any of the standard types of brake shoes and in a manner which will be easier and quicker of application than the manual custom heretofore prevailing, as well as that the lining stretched and applied to the brake shoe by my invention will provide a more efficient brake, having longer life, and is less likely to require adjustment than brake linings that have heretofore been otherwise and manually applied.

The flattened outer end of screw 23 enables said screw to be tightened and loosened manually by direct contact of the fingers with said flattened portion 24, which with the substantially star-shaped exterior or periphery of wheel 27 enables the same to be turned tight as may be desired without slippage of the hands even when they may be greasy, as frequently occurs to automotive mechanics.

It will be observed that the longitudinal axis of clamping screw 26 is in a plane which passes adjacent the outer or lower edge of the heretofore described brake lining clamping means for the purpose of avoiding lateral strain and thrust upon the tool, so that little, if any, of the clamping stress upon the brake lining 13 is lost by frictional contact between the tool and the brake shoe. It will further be observed that the type of brake shoe 10 shown in Figure 1 is normally provided with a relief depression 35 commencing adjacent the opening 11 and upon the side thereof toward opening 12 of brake shoe 10, and that the tool is preferably clamped to the brake lining with clamp jaw 19 occupying said recess 35, and that the semi-arch shape of my tool is preferably such that from the point of its jaw 19 the tool retreats from the surface of the brake shoe, as well as that in the type of shoe shown in Figure 1 there is little, if any, frictional contact between brake shoe 10 and the clamping end of my tool, due to said recess 35 normally in said type of shoe 10.

It will furthermore be observed that in the type of brake shoe shown in Figure 3, the tip of jaw 19 is in relatively slight frictional contact with the outer periphery of said shoe 10a when my tool is clamping brake lining thereto, due to the fact that such type of brake shoe is not normally provided with any recess 35, such as shown normally in the type of brake shoe shown in Figure 1.

I have illustrated and described the preferred means which I have accomplished in practice the aforesaid objects of my invention, but I do not desire to limit myself specifically to such preferred form as it will be obvious to those skilled in the art, when they become acquainted with my invention, that more or less minor changes may be made therein within the substantial scope of the appended claims.

Having now so very clearly described my invention that others skilled in the art may make and use the same therefrom, what I claim and pray to secure by Letters Patent is:

1. In means for stretching brake lining to a brake shoe or the like to which one end of the lining is adapted to be secured, the combination of a clamp adapted to be secured to the other end of said brake lining, an arm rigid with one of the jaws of said clamp and extending past the free end of said brake shoe, a screw threaded in the outer end of said arm, a swivelled clamping head upon the end of said screw adjacent said last named end of said brake shoe and means whereby said screw may be turned.

2. In a brake lining stretcher, a member having relatively movable clamp jaws at one end, means for relatively moving said jaws, a screw threaded in the opposite end of said member, a swiveled clamping member upon the end of said screw extending toward said clamp jaws, and means whereby said screw may be turned.

3. In a brake lining stretcher, a member, clamping means for removably securing brake lining to said member, and a screw carried by said member with its longitudinal axis in a plane adapted to pass through the longitudinal center of the width of the lining, with the head of said screw being adapted to bear against a portion of the support of the lining for stretching said lining.

4. In a brake lining stretcher, a member, clamping means carried by said member for removably securing brake lining to one end of said member, and a screw carried by the opposite end of said member with its longitudinal axis in a plane adapted to pass through the longitudinal center of the width of said lining and of said lining securing means, said screw having a head adapted to bear against a portion of the support of the lining for stretching the lining.

5. In a brake lining stretcher, an arched member, means for removably securing brake lining to one end of said member, a screw carried by the arched portion of said member with its longitudinal axis in a plane adapted to pass through the longitudinal center of the width of said lining and of said lining securing means, and a swivel head upon the end of said screw extending toward said securing means.

6. In a brake lining stretcher, a member provided with an arched portion at one end, a screw threaded through the free end of the arched portion of said member, and means carried by the remaining end of said member for removably securing brake lining thereto.

7. In a brake lining stretcher, a member provided with an arched portion at one end, a screw threaded through the arched portion adjacent the end of said member, means carried by said member for removably securing brake lining thereto, and a channeled clamping head swiveled upon the end of said screw.

8. In a brake lining stretcher, a member having a substantially flat end, a clamp jaw having a substantially flat surface juxtaposed to a surface of said flat end of said member, means for movably mounting said clamp jaw upon said member, means for relatively moving said jaw and said flattened end of said member, and a screw carried by said member for stretching said lining.

9. In a brake lining stretcher, a member having a substantially flat end, a clamp jaw having a substantially flat surface juxtaposed to a surface of said flat end of said member, means for movably mounting said clamp jaw upon said member, means for relatively moving said jaw and said flattened end of said member, and a channeled clamping head swiveled upon said screw.

10. In a brake lining stretcher, a member, means for removably securing brake lining to said member, revoluble means carried by said member for stretching said lining, and a clamping head swiveled upon said revoluble means and having a channel in its clamping surface with a recess in said channel whose center is substantially in the plane of the axis of said revoluble means.

11. In a brake lining stretcher, supporting means, means for removably attaching brake lining to said means, stretching means revolubly mounted upon said supporting means, and a clamping head swiveled to said stretching means and having a channel in its clamping face provided with a recess.

Signed at Minneapolis, in the county of Hennepin and State of Minnesota, this 14th day of August 1929.

ANDREW OSCAR WISTI.